Patented Apr. 24, 1951

2,549,763

UNITED STATES PATENT OFFICE 2,549,763

PROCESS OF ISOLATING BETAINE FROM GUAYULE EXTRACT

Thomas F. Banigan, Jr., and James W. Meeks, Salinas, Calif., and Ralph W. Planck, New Orleans, La., assignors to the United States of America as represented by the Secretary of Agriculture No Drawing. Application January 17, 1950, Serial No. 139,111

7 Claims. (Cl. 260—501)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the isolation of betaine and has among its objects the provision of an improved and simplified process of isolating of betaine from guayule extract, as its phosphate, from guayule or other betaine-containing source materials.

Methods are known for isolating betaine from natural sources but these methods give low yields and/or involve cumbersome techniques. One known method involves acidifying an aqueous extract of guayule with hydrochloric acid then concentrating the acidified extract, filtering off precipitated material and allowing the betaine hydrochloride to crystallize out of solution. This and similar methods which are based on isolation of betaine as its hydrochloride give poor yields particularly because of the high solubility of the betaine hydrochloride, i. e., 59 parts per 100 parts water.

It has now been found that betaine can be isolated in high yields from its source materials by a simple procedure. In essence our process involves crystallizing the betaine as its phosphate from a solution of the source material in an alcohol or other oxygenated organic solvent. Thus in proceeding in accordance with this invention, a solution of the source material in an oxygenated organic solvent is first prepared. This solution is then acidified with phosphoric acid and the betaine phosphate allowed to crystallize out of solution. The efficiency of our process stems essentially from the fact that betaine phosphate has a solubility in alcohol of only one-eighth that of betaine hydrochloride in this solvent. Thus we have determined that in 95% ethanol at 25° C., the solubility of the phosphate is 0.28% whereas the solubility of the hydrochloride is 2.16%. It is to be emphasized that it could not be predicted that the phosphate would be so poorly soluble in alcohol because in water the reverse situation exists, i. e., the phosphate has a solubility of 72.98 parts per 100 parts water and the hydrochloride has a solubility of 59.43 parts per 100 parts water. Another advantage of our process over the method using hydrochloric acid is that the starting solution need not be concentrated to the high degree to induce crystallization and high yield of product as required with the hydrochloride process. Eliminating the necessity for drastic concentration, which usually involves heat, tends to preserve the identity and the nature of the other components in the solution many of which are thermally unstable. Another point is that in our process, the phosphoric acid need not be added in great excess. Usually little more than a stoichiometric quantity of phosphoric acid is required to obtain quantitative precipitation of the desired salt in contrast to the two- to three-fold excess of hydrochloric acid required to induce crystallization in the known process. This factor is important in that the mother liquor remaining from our process is still useful for isolation of other components. Thus we can use the mother liquor from our process for the recovery of parthenyl cinnamate by the process set forth in the patent application of J. W. Meeks, T. F. Banigan, Jr., and R. W. Planck, Serial No. 127,504, filed November 15, 1949. Other advantages of our process are that the crystals of betaine phosphate attain a desirable size more rapidly and are more free of colored contaminants than in the hydrochloride process.

In preparing the oxygenated organic solvent solution of the betaine-containing source material one can proceed in many alternative ways. One method is to extract the source material with water, concentrate the aqueous extract by evaporation, decolorize it if necessary by treating it with active carbon or other decolorizing agent, filter off insoluble material and mix the concentrate with the oxygenated organic solvent. Another method is to extract the source material with an oxygenated organic solvent thus to prepare directly the desired solution. In isolating betaine from guayule it is most convenient to start with the solution which is obtained when comminuted guayule shrub or resinous guayule rubber is extracted with an oxygenated organic solvent for the purpose of removing the resin from such materials as an incident to preparing resin-free guayule rubber. This solution is preferably treated to remove the resin prior to the betaine isolation step. Thus the solution so obtained is evaporated preferably under vacuum to cause separation of the solution into two phases—a non-resinous phase containing the betaine and a resin phase. The non-resinous phase can also be referred to as a water extract or aqueous phase as it contains water and water-soluble constituents derived from the guayule material. The non-resinous phase is separated from the resin phase and dissolved in an oxygenated organic solvent and concentrated if necessary. Preferably, this solution is de-waxed before carrying out the isolation procedure. This dewaxing can be accomplished readily by allowing the solution to stand, preferably under-refrigeration, whereupon the wax will precipitate out of solution and can easily be separated as by filtration or centrifugation. However, it is not essential to remove waxes at this point as the betaine phosphate precipitating out in the subsequent treatment has such low solubility in the oxygenated solvent compared to the waxes that purification of the crude precipitate may be readily effected by solvent washings and/or recrystallization. The concentration of betaine in the solution of the source material is not critical because of the low solubility of betaine phosphate. In general, we prefer to use solutions which contain 20% or less of betaine as such solutions yield crystalline betaine phosphate of high purity and large crystal size.

A wide choice is possible with regard to the particular oxygenated organic solvent used. In general, we prefer to use those solvents which are useful for the deresination of guayule shrub or resinous guayule rubber. Thus ethanol is preferred because of its low cost, high solvency characteristics for guayule resin, and particularly because of its relatively poor solvency power with regard to the betaine phosphate. Other solvents which may be used are, for example, methanol, propanol, isopropanol, butanols, acetone, and so forth. If desired, mixtures of individual solvents may be employed.

Having prepared a solution of the source material in the oxygenated organic solvent, the solution is then treated with phosphoric acid to form the betaine-phosphoric acid salt. Generally, we employ the commercially available 85% phosphoric acid. The amount of acid used should be such as to provide equimolar proportions of $H_3PO_4$ and betaine, however, we generally add a slight excess (about 10%–25%) of the acid to ensure rapid crystallization of the betaine phosphate. The betaine phosphate crystals are separated as by decantation, filtration, or centrifugation and may be further purified by washing with the oxygenated organic solvent, by dissolving in a minimum quantity of water and reprecipitating by the addition of oxygenated organic solvent or by recrystallizing from the oxygenated organic solvent. The point at which the phosphoric acid is added is not critical. Thus the source material may be first acidified with phosphoric acid and then mixed with the oxygenated organic solvent.

The betaine phosphate isolated by our procedure and purified by dissolving in a minimum of water and precipitation with ethanol is obtained as large, white platelet crystals with a melting point of 210°–211° C. and has the formula

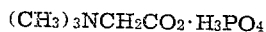

$(CH_3)_3NCH_2CO_2 \cdot H_3PO_4$

If desired, betaine phosphate may be converted by appropriate chemical treatment into other useful compounds. Thus by simple metathesis the phosphate can be converted into other salts such as the hydrochloride, picrate, sulphate, and so forth. Further, the phosphate may be converted into betaine itself by well known procedures such as by ion exchange.

The following example demonstrates the process of this invention in greater detail. It is understood that this example is submitted only by way of illustration and not limitation.

EXAMPLE (A) *Preparation of alcohol extract*

125 gallons of an acetone extract of comminuted guayule shrub (variety 593) containing 1.5% solids was subjected to evaporation under vacuum. The residue separated into 2 phases—an upper non-resinous (aqueous) phase (1.5 gallons) and a lower phase consisting of the guayule resin (1.35 gallons). The non-resinous phase was mixed thoroughly with 5 gallons of 95% ethanol and allowed to stand. After several hours the clear supernatant solution was decanted from the dark residue of waxes (about 350 grams, dry weight) and concentrated under vacuum to an aqueous alcoholic solution weighing 8 kilograms and containing 63% solids.

(B) *Crystallization of betaine phosphate*

To a 100-gram aliquot portion of the aqueous alcohol solution prepared in part A was added 10 grams of 85% phosphoric acid. Immediately, the betaine phosphate crystallized out of solution in the form of small prisms which were separated by decanting. Yield: 13.6 grams of betaine phosphate.

The mother liquid was evaporated to dryness and the residue was found to contain no betaine nor betaine phosphate. Thus it was determined that the process resulted in quantitative crystallization of the betaine phosphate.

(C) *Crystallization of betaine hydrochloride*

The following experiment is not illustrative of the process of this invention but is furnished to demonstrate the poor results obtained when using the hydrochloride method.

An attempt was made to isolate betaine as its hydrochloride by adding hydrochloric acid to an aliquot portion of the aqueous alcohol solution prepared in part A. It was found that approximately three times the molar quantity of hydrochloric acid was used as compared to the phosphoric acid used in part B before crystallization was observed to begin. The crystals formed slowly over several hours and were obtained as very small monoclinic prisms and fragments. The betaine recovery was much less than with the use of phosphoric acid.

Having thus described our invention, we claim:

1. The process of isolating betaine as its phosphate from the solvent extract obtained in the preparation of resin-free guayule rubber which comprises concentrating the extract, allowing the concentrated extract to separate into a non-resinous phase containing betaine and a resin phase, separating the non-resinous phase, mixing it with an oxygenated organic solvent and acidifying it with phosphoric acid, then separating the betaine phosphate which crystallizes out of solution.

2. The process in accordance with claim 1 wherein the oxygenated organic solvent is ethanol.

3. The process in accordance with claim 1 wherein the oxygenated organic solvent is acetone.

4. The process of isolating betaine in the form of its phosphate from guayule which comprises evaporating an oxygenated organic solvent extract of guayule, allowing the evaporated extract to separate into a non-resinous phase containing betaine and a resin phase, separating the non-resinous phase, mixing it with an oxygenated organic solvent, acidifying the resulting solution with phosphoric acid and separating the betaine phosphate which crystallizes out of solution.

5. The process of isolating betaine as its phosphate from the non-resinous phase which is formed when an oxygenated organic solvent extract of guayule is concentrated which comprises mixing said non-resinous phase with an oxygenated organic solvent, acidifying the resulting solution with phosphoric acid and separating the betaine phosphate which crystallizes out of solution.

6. The process of isolating betaine as its phosphate from the non-resinous phase which is formed when an oxygenated organic solvent extract of guayule is concentrated which comprises mixing said non-resinous phase with an oxygenated organic solvent, dewaxing the resulting solution, acidifying the dewaxed solution with phosphoric acid and separating the betaine phosphate which crystallizes out of solution.

7. The process of isolating betaine as its phosphate from the non-resinous phase which is formed when an oxygenated organic solvent extract of guayule is concentrated which comprises mixing said non-resinous phase with about 3 volumes of ethanol, allowing the solution to stand until the waxes are precipitated, separating the waxes, acidifying the de-waxed solution with phosphoric acid and separating the betaine phosphate which crystallizes out of solution.

RALPH W. PLANCK.
THOMAS F. BANIGAN, Jr.
JAMES W. MEEKS.

REFERENCES CITED

The following references are of record in the file of this patent:

Andrlik, Chem. Zentr., vol. 1904, II, 309–310.
Andrlik, Chem. Zentr., vol. 1915, II, 265–266.